US011006034B2

(12) United States Patent
Huang et al.

(10) Patent No.: US 11,006,034 B2
(45) Date of Patent: May 11, 2021

(54) CONTINUOUS SLANTED EDGE FOCUS MEASUREMENTS SYSTEM

(71) Applicant: GoPro, Inc., San Mateo, CA (US)

(72) Inventors: Yin-Min Huang, Hayward, CA (US);
Mark Schnittker, San Jose, CA (US);
Robert Hoffman, Fremont, CA (US);
Emilio Graff, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/330,222

(22) PCT Filed: Aug. 24, 2017

(86) PCT No.: PCT/US2017/048510
§ 371 (c)(1),
(2) Date: Mar. 4, 2019

(87) PCT Pub. No.: WO2018/044694
PCT Pub. Date: Mar. 8, 2018

(65) Prior Publication Data
US 2019/0208191 A1 Jul. 4, 2019

Related U.S. Application Data

(60) Provisional application No. 62/383,374, filed on Sep. 2, 2016.

(51) Int. Cl.
*H04N 17/02* (2006.01)
*H04N 5/232* (2006.01)
(Continued)

(52) U.S. Cl.
CPC ......... *H04N 5/23212* (2013.01); *G03B 43/00* (2013.01); *H04N 17/002* (2013.01)

(58) Field of Classification Search
CPC .................................................. H04N 17/002
(Continued)

(56) References Cited

U.S. PATENT DOCUMENTS

2004/0128102 A1* 7/2004 Petty ....................... G01S 5/163
702/150
2008/0162073 A1* 7/2008 Holecek ............... G01B 11/306
702/150

(Continued)

FOREIGN PATENT DOCUMENTS

WO 2016018327 A1 2/2016

OTHER PUBLICATIONS

International Preliminary Report on Patentability for Application No. PCT/US2017/048510, dated Mar. 14, 2019, 8 pages.

(Continued)

*Primary Examiner* — Jefferey F Harold
*Assistant Examiner* — Sihar A Karwan
(74) *Attorney, Agent, or Firm* — Young Basile Hanlon & MacFarlane, P.C.

(57) ABSTRACT

A continuous slanted edge focus measurement system characterizes focus of a camera lens. The measurement system may be used to measure effects on focus on caused by factors such as thermal focal shift, humidity focal shift, focal shift caused by changing parts in the camera, and focal shift by changing the camera design. An accurate measurement system enables camera designers to optimize focus under a variety of different conditions and ensure consistency in the products.

18 Claims, 10 Drawing Sheets

(51) Int. Cl.
 *H04N 17/00* (2006.01)
 *G03B 43/00* (2021.01)
(58) Field of Classification Search
 USPC .......................................................... 348/187
 See application file for complete search history.

(56) References Cited

U.S. PATENT DOCUMENTS

| | | | |
|---|---|---|---|
| 2010/0245541 A1* | 9/2010 | Zhao ........................ | G01D 1/00 |
| | | | 348/45 |
| 2014/0218590 A1 | 8/2014 | Nunnink | |
| 2015/0138377 A1 | 5/2015 | Askey et al. | |
| 2015/0150435 A1 | 6/2015 | Morrissette et al. | |

OTHER PUBLICATIONS

International Search Report and Written Opinion for International Application No. PCT/US2017/048510 dated Nov. 6, 2017.

* cited by examiner

CONTINUOUS SLANTED EDGE FOCUS MEASUREMENTS SYSTEM

RELATED APPLICATIONS

This application claims the benefit of U.S. Provisional Application No. 62/383,374 filed on Sep. 2, 2016, which is incorporated by reference herein.

BACKGROUND

Technical Field

This application relates generally to a camera testing system and more particularly, to a focus measurement system.

Description of the Related Art

Fixed focus cameras are common in devices such as mobile phones and action cameras. Such cameras are desirable because they can be produced relatively inexpensively compared to adjustable focus cameras and have fewer points of failure. In order to ensure that fixed focus cameras can produce sufficiently focused images, a precise testing system for use during production is desirable.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1A:
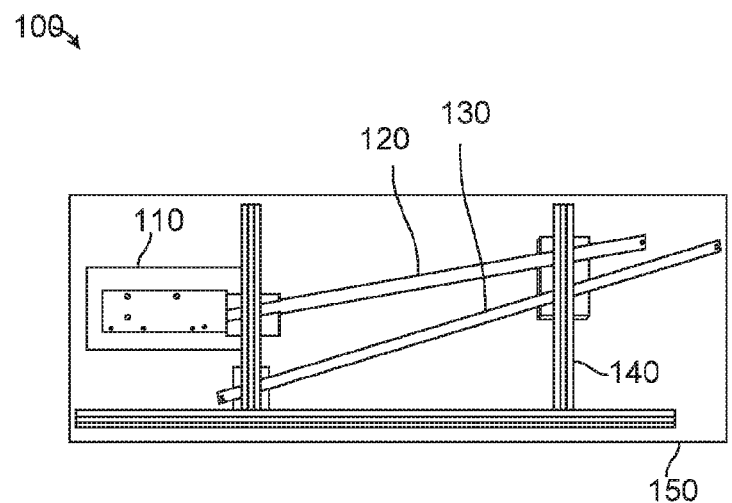
FIG. 1A is a side view of an embodiment of a slanted edge focus measurement system.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A measurement system characterizes focus of a camera. The measurement system comprises a unit under test holder, a slanted edge target sub-system, an illumination device, a fixture, and an enclosure. The unit under test holder holds a camera at a fixed position and orientation. The slanted edge target sub-system has a slanted edge target surface with a target pattern for capturing as an image by the camera. The target pattern comprises a line having a slanted edge positioned to intersect a center of the image when captured by the camera. The slanted edge may be oriented at an acute angle relative to the optical axis of the camera. Furthermore, the target pattern may comprise a plurality of fiducials including lines that are substantially horizontal in the image when captured by the camera. The plurality of fiducials may be at varying distances from the camera. The illumination device may be positioned under the slanted edge target sub-system and may have an illuminating surface for illuminating the target pattern. The fixture may support the unit under test holder, the slanted edge target sub-system, and the illumination device. The enclosure may enclose the unit under test holder, the slanted edge target sub-system, the illumination device, and the fixture.

Beneficially, the measurement system enables the camera to capture images of the target pattern in a highly repeatable manner. The pattern in the captured image can be analyzed using an image processing algorithm to measure a focal quality at varying distances from the camera. This information can be used to calibrate the camera focus.

Measurement System

A continuous slanted edge focus measurement system characterizes focus of a camera lens. The measurement system may be used to measure effects on focus on caused by factors such as thermal focal shift, humidity focal shift, focal shift caused by changing parts in the camera, and focal shift by changing the camera design. An accurate measurement system enables camera designers to optimize focus under a variety of different conditions and ensure consistency in the products.

Figure 1B:
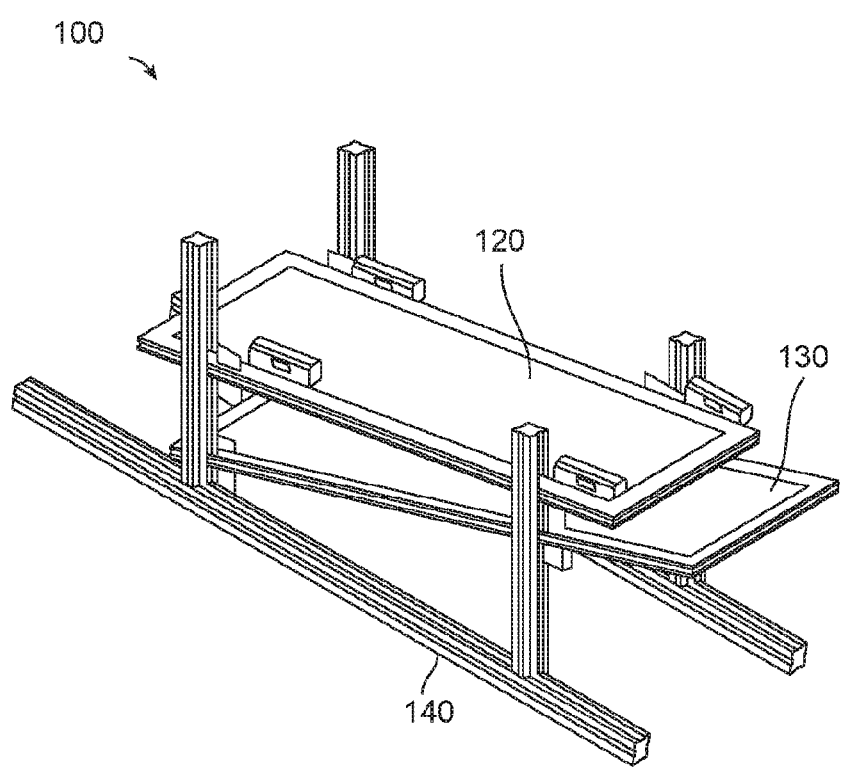
FIG. 1B is a perspective view of an embodiment of a slanted edge focus measurement system.

An embodiment of the measurement system 100 for characterizing focus of a camera is illustrated in FIGS. 1A-B. The measurement system comprises a unit under test (UUT) holder sub-system 110, a slanted edge target sub-system 120, an illumination sub-system 130, and a fixture/enclosure sub-system 140. The UUT holder sub-system 110 holds the camera being tested at a fixed position and orientation relative to the other sub-systems. The slanted edge target sub-system 120 provides a target pattern captured by the camera during the test. The target pattern is designed such that the image captured by the camera of the target pattern can be processed according to predefined algorithm to generate one or more metrics indicative of the focal quality of the camera. The illumination sub-system 130 illuminates the slanted edge target sub-system in order to provide appropriate lighting to enable accurate characterization of the focal quality of the camera based on the captured image. The fixture/enclosure sub-system 140 provides a structural support for the other sub-systems and blocks external sources of light that may affect the measurement. Each of the sub-systems are described in detail below.

UUT Holder Sub-System

Figure 2:
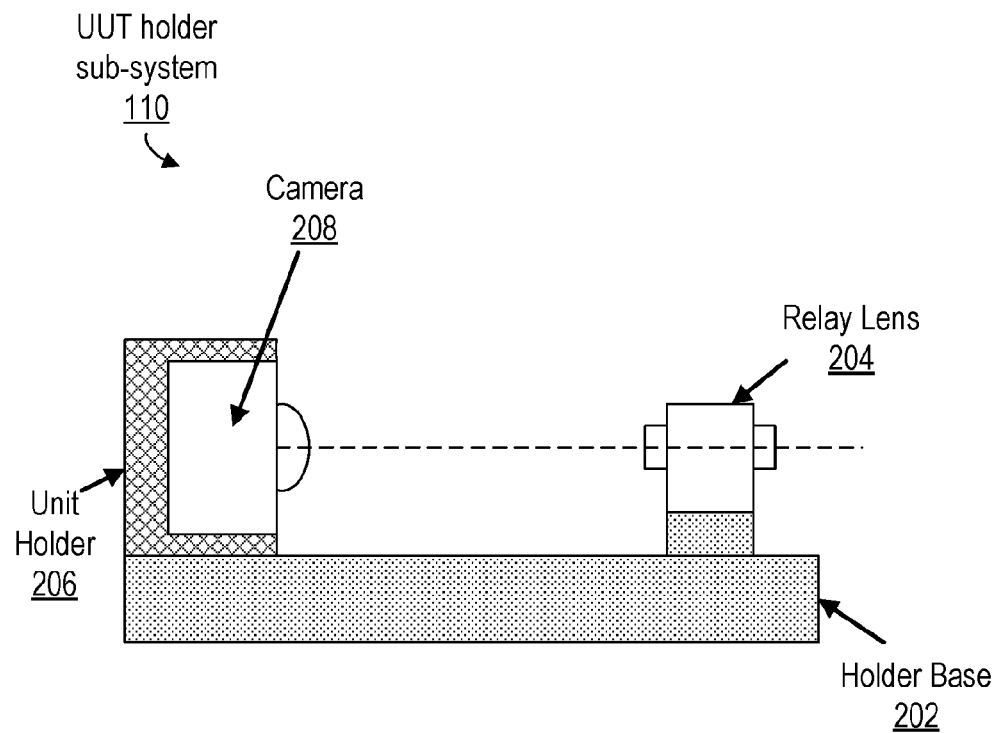
FIG. 2 is an embodiment of a unit under test holder sub-system for a slanted edge focus measurement system.

FIG. 2 illustrates an example embodiment of the UUT holder sub-system 110. The UUT holder sub-system may comprise a holder base 202, a relay lens 204, and a unit holder 206 for holding a camera 208. The holder base 202 provides a platform for attaching different unit holders 206 structured to hold different cameras 208 with different form factors. The holder base 202 is designed to enable removal and attachment of different unit holders 206 with high ease of mounting and high repeatability. The holder base 202 furthermore provides a fixture on which a relay lens 204 may be mounted with a fixed distance to the vertex of the lens of the camera 208 under test (e.g., a distance of 35-45 mm).

The unit holder 206 is designed to hold the UUT (e.g., camera 208) and provides a highly repeatable mechanical location that ensures the camera 208 is mounted in the same position and orientation in each test. The unit holder 206 is furthermore designed to enable access to all buttons and connectors on the camera 208. The unit holder 206 may be removable from the holder base 202 and different unit holders 206 may be swapped in and out that each are structured to hold cameras 208 with different form factors.

The relay lens 204 is positioned between the camera 208 and the slanted edge target described in further detail below. The relay lens 204 beneficially enables a slanted edge target having a shortened length (relative to what would be needed without the relay lens 204) while maintaining the same magnification. The relay lens 204 may also be removable from the holder base 202 in one embodiment, in order to enable relay lenses 204 of different optical characteristics to be swapped in and out of the holder base 202 depending on the camera 208 being tested and the type of test being performed.

Slanted Edge Target Sub-System

Figure 3A:
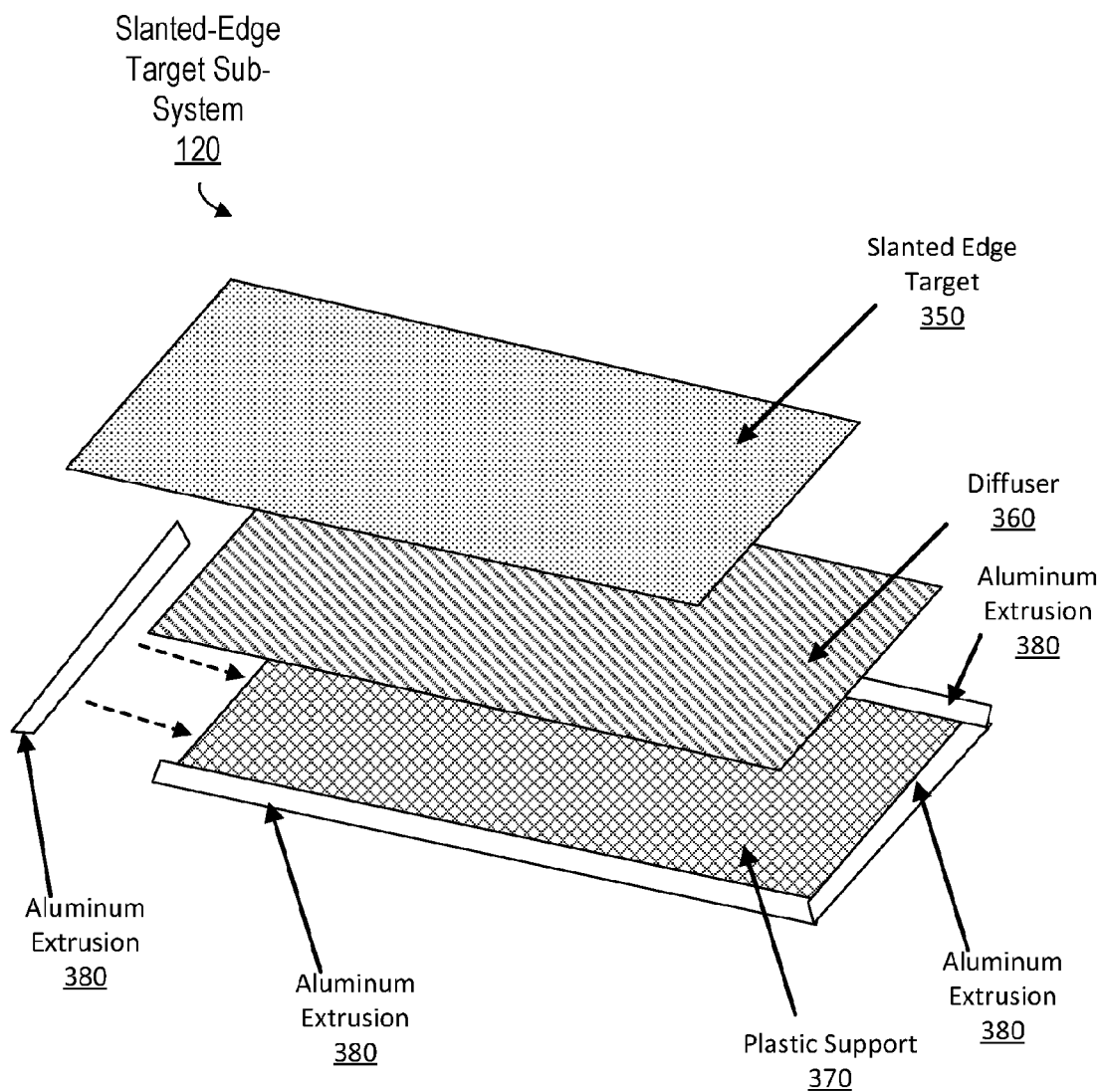
FIG. 3A is an exploded view of an embodiment of a slanted edge target sub-system for a slanted edge focus measurement system.

FIG. 3A illustrates an exploded view of an example slanted edge target sub-system 120. A rectangular frame (e.g., 1195 mm×340 mm) may be assembled using aluminum extrusions 380 (e.g., 25 mm aluminum). A clear plastic (e.g., acrylic) support 370 forms the bottom layer and fits within the frame of the aluminum extrusions 380. The support layer provides structural support for the diffuser layer 360 and the slanted edge target panel 350. The diffuser layer 360 on top of the plastic support 370 includes some grainy feature on the top surface to diffuse the light from the illumination sub-system 130 described in further detail below. A slanted edge metal target panel 350 is layered on top of the diffuser layer 360. The slanted edge target panel 350 comprises a rectangular etched surface (e.g., a metal surface) having a test pattern that can be captured as an image by the camera 208 during a test. In an embodiment, the slanted edge target panel 350 may be approximately 1100-1150 mm long. The material and etched process may be chosen to provide an optical sharp knife-edge quality on the pattern. The test pattern may be created, for example, by cutouts in the metal surface or by etching portions of the metal surface in a bright color (e.g., white) and/or etching portions of the metal in a dark color (e.g., black).

Figure 3B:
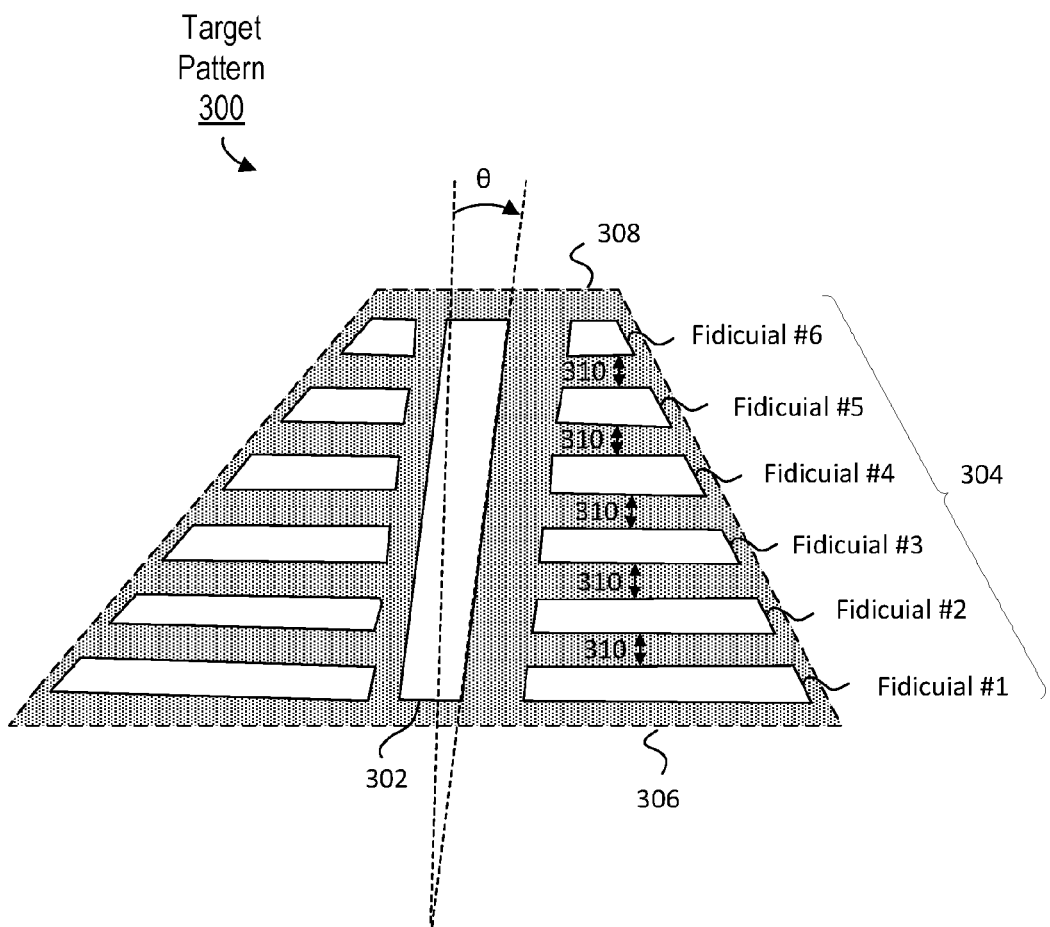
FIG. 3B is an embodiment of a test pattern for a slanted edge focus measurement system.

FIG. 3B illustrates an example of a target pattern 300 seen by the camera 208 when the slanted edge target sub-system 120 is installed at a 10° inclined angle with respect to the holder base 202 of the UUT holder sub-system 110. The target pattern 300 is designed such that the camera 208 sees a center slanted edge line 302 at a fixed angle θ (e.g., 8 degrees on the right side with a clockwise direction) that runs from a near edge 306 of the slanted edge metal target panel 350 (closest to the camera 208) and a far edge 308 of the slanted edge target panel 350 (furthest from the camera 208). The slanted edge line 302 is positioned so that the slanted edge of the line crosses the center of the image. Furthermore, a plurality (e.g., six) of white fiducials 304 are positioned on each side of the slanted edge line 302. Each fiducial 304 comprises a horizontally-oriented line of equal width and different lengths (e.g., decreasing in length from the near edge 306 (fiducial #1) to the far edge 308 (fiducial #6)). The fiducials 304 are used by an image processing algorithm to identify distances in the captured image. The slanted edge line 302 and the fiducials 304 may be cutouts in the metal surface or may comprise etched portions of the surface that appear in a bright color (e.g., white). Five dark spacers 310 with equal space are seen between fiducials 304 on each side. The dark spacers 310 may comprise solid portions of the metal surface and may optionally be etched to appear in a dark color (e.g., black, dark brown, or dark gray.)

The fiducials 304 enable self-calibration features. Given the known distances from each fiducial line 304 to the relay lens 204, the distance of different regions of interest along the slanted edge 302 can be accurately determined. Therefore, this feature may mitigate any misalignment errors between the camera 208 and the slanted edge target sub-system 120.

Illumination Sub-System

Figure 4:
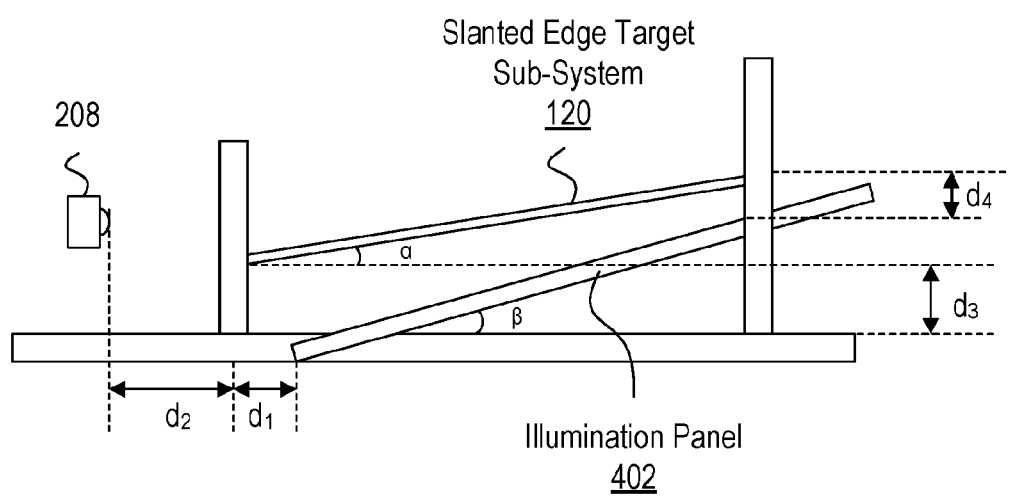
FIG. 4 is example of an embodiment of a slanted edge focus measurement system.

The illumination sub-system 130 comprises an illuminating panel (e.g., an LED panel) positioned under the slanted edge target sub-system 120 to provide a uniform backlit illumination on the slanted edge target panel 350 seen by the camera 208. The illumination uniformity measured directly on the slanted edge plane with a meter may be different compared to the uniformity seen by the camera 208 because of the relative angle between them. Therefore, the illumination sub-system 130 may be positioned to maximize the intensity uniformity as seen by the camera 208. Since Fiducial #1 of the target pattern 300 is closer to the camera 208, less illumination in the adjacent area may be sufficient compared to an area adjacent to Fiducial #6 of the target pattern 300 that is further from the camera 208. This condition can be optimized by configuring the illumination sub-system 130 as illustrated in FIG. 4. Here, an illumination panel 402 may be positioned at an angle offset from the target plane of the slanted edge target sub-system 120 such that Fiducial #1 (closest to the camera 208) of the target pattern 300 has the greatest distance to the illumination panel 402 and Fiducial #6 of the target pattern 300 (furthest from the camera 208) has the smallest distance to the illumination panel 402. For example, if the slanted edge target sub-system 120 slopes upward at an angle α from horizontal (e.g., α 10 degrees), the illumination panel 402 may be positioned to slope upward at an angle of β from horizontal (e.g., β=17 degrees) such that an angle offset of δ=β−α (e.g., δ=7 degrees) exists between the illumination panel 402 and the slanted edge target sub-system 120. The illumination panel 402 is positioned with its low edge nearest to the camera 208 at a predefined horizontal distance $d_1$ (e.g., $d_1$=90 mm) from Fiducial #1 of the target pattern 300 to reduce the amount of light illuminating Fiducial #1 when the slanted edge target sub-system 120 has its near edge a predefined horizontal distance $d_2$ (e.g., $d_2$=47 mm)

away from the vertex of the lens of the camera 208. The illumination panel 402 is also positioned such that its near edge (closest to the camera 208) is a predefined vertical distance $d_3$ (e.g., $d_3$=185 mm) from the vertical position of the near edge 306 of the slanted edge target sub-system 120 adjacent to Fiducial #1. The portion of the illumination panel 402 below the far edge 308 of the slanted edge target sub-system 120 adjacent to Fiducial #6 is another predefined vertical distance $d_4$ (e.g., $d_4$=43 mm) away. These distances may be selected to optimize the uniformity. The illumination panel 402 extends past Fiducial #6 away from the camera 208 to maintain consistent illumination intensity. This is desirable because the illumination intensity on the short edge of the illumination panel 402 tends to roll-off. Having excess length of the illumination panel avoids the roll-off area on the illumination panel affecting the uniformity on the slanted edge target panel 350. The illumination panel 402 may also be positioned so that extends past the slanted edge target sub-system 120 at the far edge opposite the camera 208.

In an embodiment, the illumination panel 402 has LED arrays installed on its long sides. Typically, the light intensity on the area along the long sides is higher than the area in the middle. Therefore, both long edges of the illumination panel may be covered (e.g., by 1.5" black gaffer tape). This prevents the light from these areas from affecting the intensity uniformity on the slanted edge metal target plane.

Figure 5:
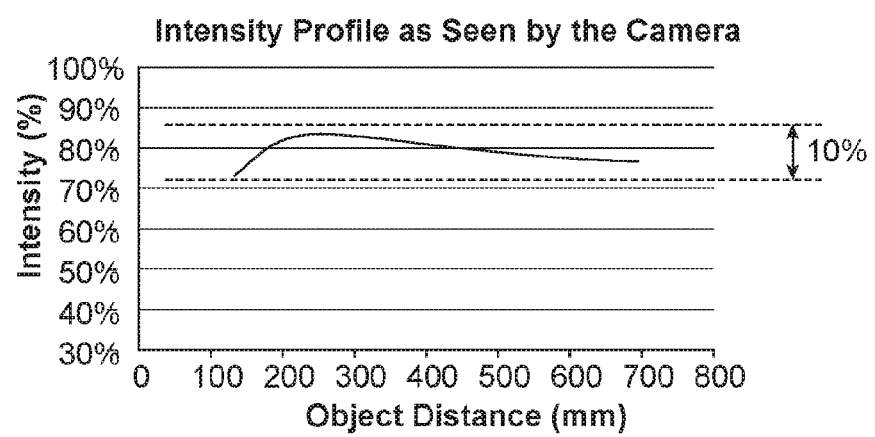
FIG. 5 is a graph illustrating an example intensity profile seen by a camera in a slanted edge focus measurement system.

The uniformity as seen at the camera 208 may be 85% or better. FIG. 5 illustrates a typical uniformity profile. In addition, the maximum intensity may be 0.90 while the minimum intensity may be 0.70. This intensity range avoids the image being under exposed or over exposed. Optionally, the DC power supply voltage may be adjusted (e.g., up to a maximum voltage of 24 VDC). In one embodiment, a voltage of 16-18V (e.g., 16.90 Volts) is used. Then, the camera shutter can be adjusted to achieve the desired intensity. The camera gain may be set as low as possible to minimize noise.

Fixture/Enclosure Sub-System

Figure 6:
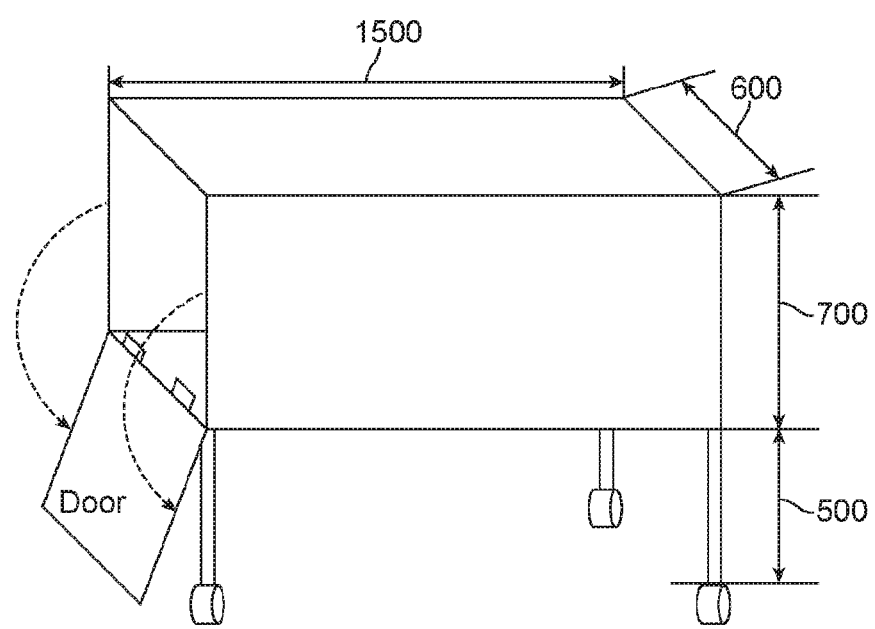
FIG. 6 is an embodiment of an enclosure for a slanted edge focus measurement system.

As illustrated in FIGS. 1A-B, the fixture 140 may comprise a set of horizontal bases with four vertical legs. The illumination sub-system 130 may be installed using brackets at the appropriate heights on vertical legs. The slanted edge target sub-system 120 may then be installed over the illumination sub-system 130 at the appropriate position and orientation using additional brackets. The camera holder sub-assembly may be attached directly to the slanted edge target sub-system 120 in one embodiment. FIG. 6 illustrates an example of an enclosure 150 that may contain the other sub-system. The enclosure 150 comprises a lightproof box having a door that enables the fixture 140, illumination sub-system 130, slanted edge target sub-system 120, and UUT holder sub-system 110 to be inserted into or removed from the enclosure 150. The enclosure 150 may include legs with wheels to enable it to be easily repositioned within a testing laboratory.

Image Processing Algorithm

Figure 7:
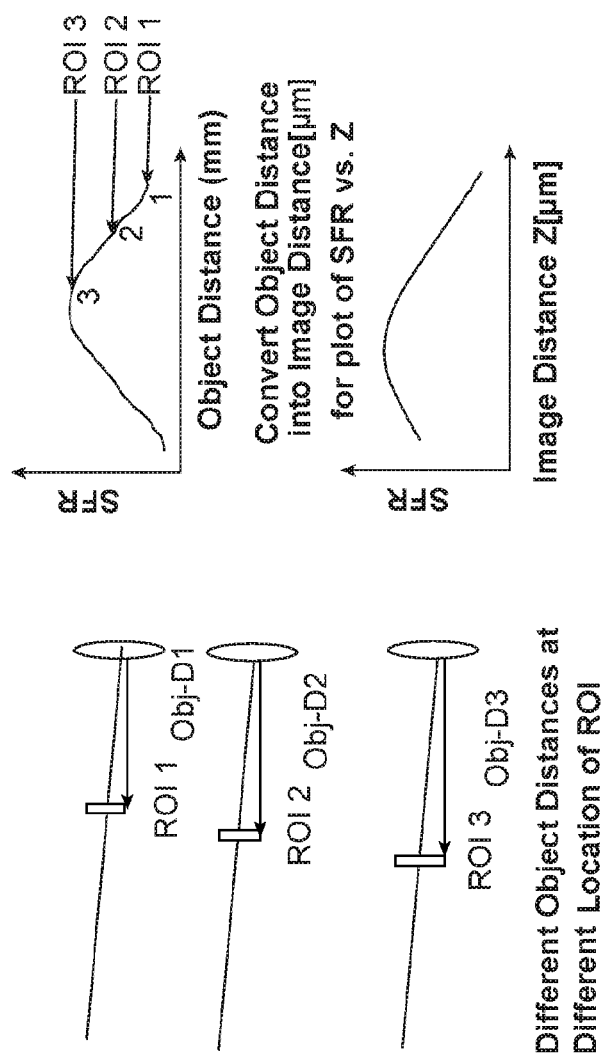
FIG. 7 is a first example plot illustrating a focal characterization of a camera using the slanted edge focus measurement system.

After capturing an image of the slanted edge target pattern 300 by the camera, an image processing algorithm is applied to the image to determine a focal quality measurement. As illustrated in FIG. 7, the captured image may be divided into a plurality of different regions of interest (e.g., ROI 1, ROI 2, ROI 3) along the slanted line edge 302. Each of these regions of interest corresponds to a different distance from the camera. A focal quality measure (e.g., Spatial Frequency Response or SFR) may be calculated for each region of interest. The object distance (physical distance) may be converted to an image distance based on known lens characteristics. FIG. 7 illustrates plots of object distance versus SFR and image distance versus SFR over a large number of samples (ROIs), thus approximating a continuous curve. The optimal image distance may be determined by identifying the peak of this curve. The lens may then be adjusted to achieve this image distance, thereby optimizing focus.

Figure 8:
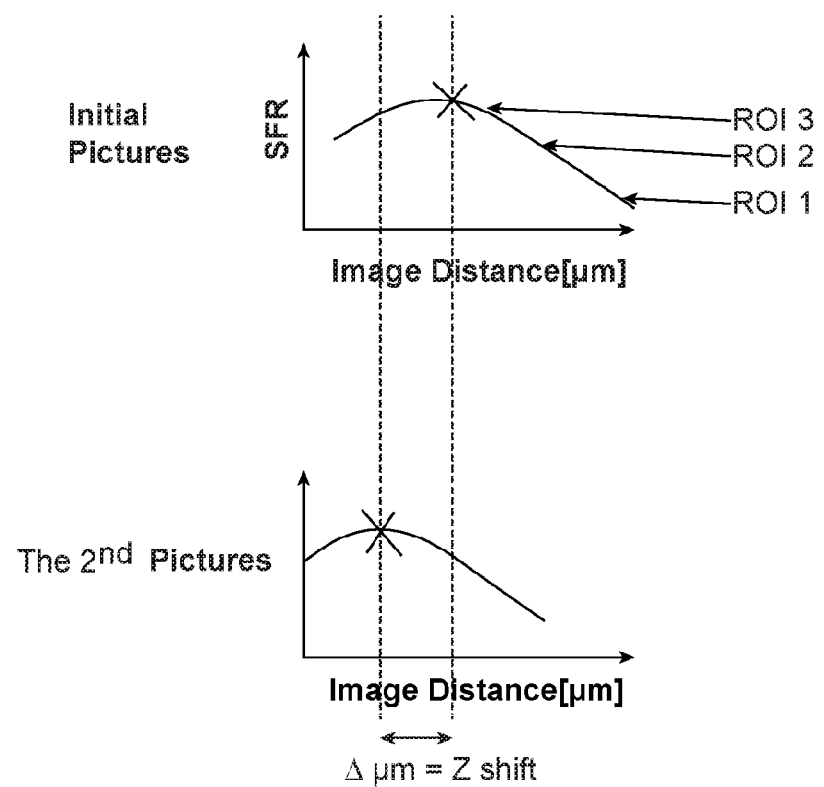
FIG. 8 is a second example plot illustrating a focal characterization of a camera using the slanted edge focus measurement system.

FIG. 8 illustrates example plots characterizing a focus shift which may occur based on some variable change occurring between capturing a first image and a second image. For example, the variable change may be a change in temperature, a change in humidity, a change in camera design, a change in camera components, or any other change that may affect camera focus. The plots illustrate different image distances with a shift (e.g., a delta) between them representing the change in optimal image distance caused by the variable change. Characterizing these changes is useful to design a system that can be optimized across an expected range of different variables.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A measurement system comprising:
    a unit under test holder for holding a camera at a fixed position and orientation;
    a slanted edge target sub-system having a slanted edge target surface with a target pattern for capturing as an image by the camera, the target pattern comprising a line having a slanted edge positioned to intersect a center of the image when captured by the camera, the slanted edge at an acute angle relative to the optical axis of the camera, and the target pattern comprising a plurality of fiducials comprising lines that are substantially horizontal in the image when captured by the camera, the plurality of fiducials at varying distances from the camera;
an illumination sub-system beneath the slanted edge target sub-system having an illuminating surface for illuminating the target pattern, the illuminating surface extending past the slanted edge target surface at a far edge of the measurement system opposite the unit under test holder;
a fixture to support the unit under test holder, the slanted edge target sub-system, and the illumination sub-system; and
an enclosure to enclose the unit under test holder, the slanted edge target sub-system, the illumination sub-system, and the fixture.

2. The measurement system of claim 1, wherein the slanted edge target surface slopes upward at a first acute angle with respect to a horizontal ground plane with increasing distance from the camera.

3. The measurement system of claim 2, wherein the illuminating surface slopes upward at a second acute angle with respect to the horizontal ground plane with increasing distance from the camera.

4. The measurement system of claim 3, wherein the slanted edge target sub-system comprises:
a slanted edge target panel including the slanted edge target surface;
a diffuser layer under the slanted edge target panel to diffuse light emitted from the illumination sub-system; and
a support layer under the diffuser layer to provide structural support for the diffuser layer and the slanted edge target panel.

5. The measurement system of claim 1, wherein the unit under test holder comprises:
a unit holder to hold the camera at the fixed position and orientation; and
a relay lens positioned along an optical axis of the camera between the camera and the slanted edge target sub-system.

6. The measurement system of claim 1, wherein the plurality of fiducials have varying lengths that decrease with distance from the camera.

7. The measurement system of claim 6, wherein the plurality of fiducials have approximately equal width.

8. A measurement system, comprising:
a unit under test holder for holding a camera at a fixed position and orientation;
a slanted edge target sub-system having a slanted edge target surface with a target pattern for capturing as an image by the camera, the target pattern comprising a line having a slanted edge at an acute angle relative to the optical axis of the camera, and the target pattern comprising a plurality of fiducials comprising lines that are substantially horizontal in the image when captured by the camera, the plurality of fiducials at varying distances from the camera; and
an illumination sub-system beneath the slanted edge target sub-system having an illuminating surface for illuminating the target pattern, the illuminating surface extending past the slanted edge target surface at a far edge of the measurement system opposite the unit under test holder.

9. The measurement system of claim 8, wherein the slanted edge target surface slopes upward at a first acute angle with respect to a horizontal ground plane with increasing distance from the camera.

10. The measurement system of claim 9, wherein the illuminating surface slopes upward at a second acute angle with respect to the horizontal ground plane with increasing distance from the camera.

11. The measurement system of claim 8, wherein the slanted edge target sub-system comprises:
a slanted edge panel including the slanted edge target surface;
a diffuser layer under the slanted edge panel to diffuse light emitted from the illumination sub-system; and
a support layer under the diffuser layer to provide structural support for the diffuser layer and the slanted edge panel.

12. The measurement system of claim 8, wherein the unit under test holder comprises:
a unit holder to hold the camera at the fixed position and orientation; and
a relay lens positioned along an optical axis of the camera between the camera and the slanted edge target sub-system.

13. The measurement system of claim 8, wherein the plurality of fiducials have varying lengths that decrease with distance from the camera.

14. The measurement system of claim 13, wherein the plurality of fiducials have approximately equal width.

15. A slanted edge target system, comprising:
a slanted edge panel having a slanted edge target surface that extends short of an illuminating surface; and
a target pattern etched into the slanted edge target surface, the target pattern comprising a line having a slanted edge positioned to intersect a center of an image when captured by a camera, the slanted edge at an acute angle relative to the optical axis of the camera, and the target pattern comprising a plurality of fiducials comprising lines that are substantially horizontal in the image when captured by the camera, the plurality of fiducials at varying distances from the camera.

16. The slanted edge target system of claim 15, further comprising:
a diffuser layer under the slanted edge panel to diffuse light emitted from an illumination sub-system below the slanted edge target system, the illumination sub-system including the illuminating surface that extends past the slanted edge target surface; and
a support layer under the diffuser layer to provide structural support for the diffuser layer and the slanted edge panel.

17. The slanted edge target system of claim 15, wherein the plurality of fiducials have varying lengths that decrease with distance from the camera.

18. The slanted edge target system of claim 17, wherein the plurality of fiducials have approximately equal width.

* * * * *